US008965389B2

(12) United States Patent
Samardzija et al.

(10) Patent No.: US 8,965,389 B2
(45) Date of Patent: Feb. 24, 2015

(54) CHANNEL INFORMATION FEEDBACK REDUCTION IN COMMUNICATION NETWORK

(75) Inventors: Dragan Samardzija, Highland Park, NJ (US); Theodore Sizer, Stuttgart (DE); Reinaldo A. Valenzuela, Holmdel, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 230 days.

(21) Appl. No.: 13/017,304

(22) Filed: Jan. 31, 2011

(65) Prior Publication Data

US 2012/0196607 A1 Aug. 2, 2012

(51) Int. Cl.
*H04W 72/00* (2009.01)
*H04J 11/00* (2006.01)
*H04L 5/00* (2006.01)
*H04B 7/02* (2006.01)
*H04B 7/06* (2006.01)

(52) U.S. Cl.
CPC .......... *H04J 11/0053* (2013.01); *H04L 5/0039* (2013.01); *H04B 7/024* (2013.01); *H04B 7/0626* (2013.01); *H04B 7/0658* (2013.01); H04L 5/0035 (2013.01)
USPC ........ 455/452.2; 455/412; 455/500; 455/451; 455/447

(58) Field of Classification Search
USPC ....................... 455/500, 412, 451, 452.2, 447
See application file for complete search history.

(56) References Cited

U.S. PATENT DOCUMENTS

2010/0167717 A1* 7/2010 Hafeez et al. .............. 455/422.1
2010/0322351 A1* 12/2010 Tang et al. .................... 375/316
2012/0155291 A1* 6/2012 Koivisto et al. .............. 370/252

OTHER PUBLICATIONS

"Feedback Overhead for DL CoMP," Alcatel-Lucent Shanghai Bell, 3GPP TSG RAN WG1 Meeting #59bis, R1-100425, Jan. 2010, 9 pages, Valencia, Spain.
D. Samardzija et al., "An Experimental Downlink Multiuser MIMO System with Distributed and Coherently-Coordinated Transmit Antennas," IEEE International Conference on Communications, Jun. 2007, pp. 5365-5370, Glasgow, Scotland.

(Continued)

*Primary Examiner* — Patrick Edouard
*Assistant Examiner* — Chuck Huynh
(74) *Attorney, Agent, or Firm* — Ryan, Mason & Lewis, LLP

(57) ABSTRACT

Techniques are disclosed for reducing channel information feedback in communication networks. For example, a method comprises the following steps. A set of mobile terminals and a set of base stations designated to participate in a coordinated multipoint transmission protocol in a communication network are identified. One or more unique downlink communication resource blocks are assigned to each designated mobile terminal that is located in a given first sector of a designated base station. As such, each designated mobile terminal in the first sector of the designated base station: (i) performs a channel state estimation process in response to respective signals received from the designated base stations in the one or more unique downlink communication resource blocks assigned to that designated mobile terminal; and (ii) transmits resulting channel state information back to at least one of the designated base stations.

18 Claims, 7 Drawing Sheets

(56) References Cited

OTHER PUBLICATIONS

M. K. Karakayali et al., "Network Coordination for Spectrally Efficient Communications in Cellular Systems," IEEE Wireless Communications, Aug. 2006, pp. 56-61, vol. 13, No. 4.

D. Samardzija et al., "Pilot Assisted Estimation of MIMO Fading Channel Response and Achievable Data Rates," IEEE Transactions on Signal Processing, Special Issue on MIMO, Nov. 2003, pp. 2882-2890, vol. 51, No. 11.

* cited by examiner

FIG. 3

| | |
|---|---|
| BANDWIDTH | W |
| FREQUENCY RESOLUTION | $\Delta W$ |
| CSI REPORT INTERVAL (TEMPORAL RESOLUTION) | $T_U$ |
| CSI QUANTIZATION RESOLUTION | Q |
| ANTENNAS PER SECTOR | $N_{TX}$ |
| ANTENNAS PER UE | $N_{RX}$ |
| CLUSTER SIZE (NUMBER OF COORDINATING SECTORS) | K |
| CSI FEEDBACK RATE, PER UE | $R_{FB\_ue} = K \times N_{RX} \times N_{TX} \times Q \times W/\Delta W \times 1/T_u$ |

US 8,965,389 B2

CHANNEL INFORMATION FEEDBACK REDUCTION IN COMMUNICATION NETWORK

FIELD OF THE INVENTION

The present invention relates generally to communication networks and, more particularly, to techniques for reducing channel information feedback in such communication networks.

BACKGROUND OF THE INVENTION

It is known that, in order to meet the demand for higher bit rates offered by wireless communication networks, the wireless communication industry is developing an enhanced version of the Long Term Evolution (LTE) standard known as LTE-Advanced. LTE-Advanced is a preliminary mobile (cellular) communication standard, which was submitted as a candidate Fourth Generation (4G) system to the Telecommunication Standardization Sector of the International Telecommunication Union (ITU-T) in late 2009, and which is expected to be finalized in 2011. As is also known, the ITU-T manages standards for the ITU. Also, LTE-Advanced is standardized by the 3rd Generation Partnership Project (3GPP) as an enhancement of the 3GPP LTE standard.

It is known that different coordinated multipoint (CoMP) transmission techniques are being considered for LTE-Advanced networks. CoMP techniques provide significant improvements in average and/or edge-user throughput. In a downlink aspect of CoMP (i.e., base station to user mobile terminal link), it is required that multiple mutually remote base stations jointly transmit data to one or more user mobile terminals. CoMP transmission techniques are generally described, for example, in D. Samardzija et al., "An Experimental Downlink Multiuser MIMO System with Distributed and Coherently-Coordinated Transmit Antennas," IEEE ICC, Glasgow, Scotland 2007; and M. K. Karakayali et al., "Network Coordination for Spectrally Efficient Communications in Cellular Systems," IEEE Wireless Communications, vol. 13, no. 4, pp. 56-61, August 2006, the disclosures of which are incorporated by reference herein.

In order to perform the downlink CoMP transmission, the network must have knowledge of all the channel states between base station and mobile terminal antennas, for all the mobile terminals that are the subject of the CoMP transmission, i.e., recipients of the CoMP transmission. Each mobile terminal performs downlink channel state estimation, e.g., pilot-assisted estimation using pilots broadcasted by the base stations. Channel state estimation is generally described, for example, in D. Samardzija et al., "Pilot Assisted Estimation of MIMO Fading Channel Response and Achievable Data Rates," IEEE Transactions on Signal Processing, Special Issue on MIMO, vol. 51, pp. 2882-2890, November 2003; and Feedback Overhead for DL CoMP, 3GPP TSG RAN WG1 #59bis Meeting, Alcatel-Lucent, Alcatel-Lucent Shanghai Bell, January 2010, the disclosures of which are incorporated by reference herein. The channel state estimates, also referred to as channel state information (CSI), are then fed back to the base station over the uplink (i.e., user mobile terminal to base station link). However, the uplink CSI feedback traffic is an overhead which lowers the throughput of the user data traffic.

SUMMARY OF THE INVENTION

Embodiments of the invention provide techniques for reducing channel information feedback in communication networks.

For example, in one aspect, a method comprises the following steps. A set of mobile terminals and a set of base stations designated to participate in a coordinated multipoint transmission protocol in a communication network are identified. One or more unique downlink communication resource blocks are assigned to each designated mobile terminal that is located in a given first sector of a designated base station (i.e., each designated mobile terminal in the same sector). As such, each designated mobile terminal in the first sector of the designated base station: (i) performs a channel state estimation process in response to respective signals received from the designated base stations in the one or more unique downlink communication resource blocks assigned to that designated mobile terminal; and (ii) transmits resulting channel state information back to at least one of the designated base stations.

Advantageously, such techniques reduce the overhead associated with the transmission of channel state information by assigning unique downlink communication resource blocks (e.g., frequency or temporal bands) to each mobile terminal in the same base station sector. In this way, mobile terminals in the same assignment (allocation) group feed back channel state estimates corresponding only to the one or more downlink communication resource blocks to which they are assigned, thus limiting the overall uplink channel state information feedback rate.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating network factors that affect uplink channel information feedback data rate according to one or more embodiments of the invention.

DETAILED DESCRIPTION OF PREFERRED EMBODIMENTS

The following description will illustrate the invention in the context of an exemplary cellular network environment associated with the LTE-Advanced standard. It should be understood, however, that while principles of the invention are particularly suitable to such a cellular network environment, the invention is not limited to use with such an environment. That is, principles of the invention are generally applicable to any suitable communication environment in which it would be desirable to reduce the overhead associated with the transmission of channel state information.

Figure 1A:
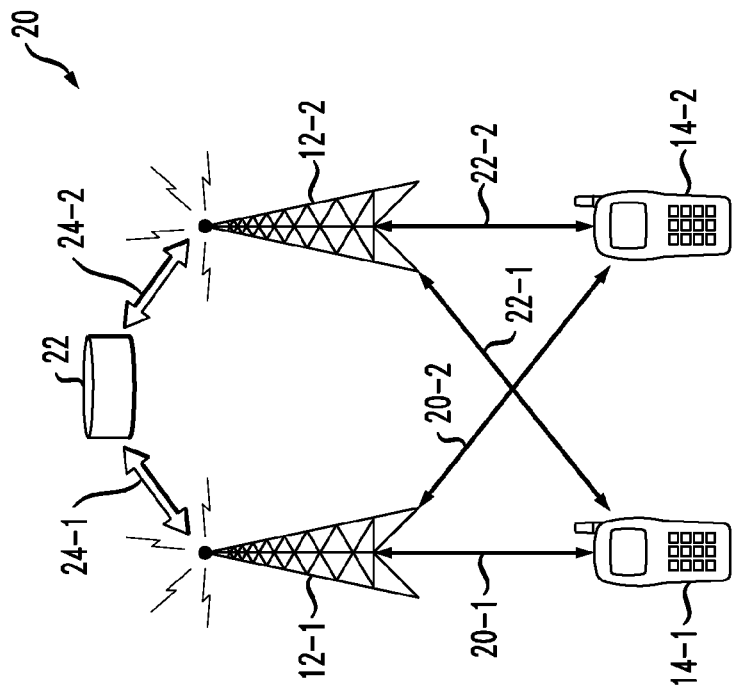
FIG. 1 is a diagram illustrating a difference between a CoMP network and a non-CoMP network.

Before describing illustrative embodiments of the invention, a brief description is given here of a main difference between a CoMP network and a non-CoMP network. FIG. 1 depicts a main conceptual difference.

As shown in the leftmost network 10 in FIG. 1, denoted as (A), a base station 12-1 communicates with a mobile terminal 14-1 via wireless link 16-1, while a base station 12-2 communicates with a mobile terminal 14-2 via wireless link 16-2. Note that each mobile terminal is connected to a single base station. While desired signals are transmitted between base station 12-1 and mobile terminal 14-1, and between base station 12-2 and mobile terminal 14-2, note that interference denoted as 18-1 from the transmissions between base station 12-1 and mobile terminal 14-1 adversely affects transmissions between base station 12-2 and mobile terminal 14-2, and vice versa (interference denoted as 18-2). The adverse effect is that data rates between the corresponding base station and mobile terminal are limited by the interference.

Conversely, in a CoMP network, as shown in the rightmost network 20 in FIG. 1, denoted as (B), each mobile terminal receives desired signals from multiple base stations. Thus, mobile terminal 14-1 receives useful signals from base station 12-1 (denoted by link 20-1) and base station 12-2 (denoted by link 22-1). Likewise, mobile terminal 14-2 receives useful signals from base station 12-1 (denoted by link 20-2) and base station 12-2 (denoted by link 22-2). Thus, all signals received by a mobile terminal are potentially useful, and thus interference caused by cross-base station/mobile terminal links is substantially eliminated.

Figure 1B:
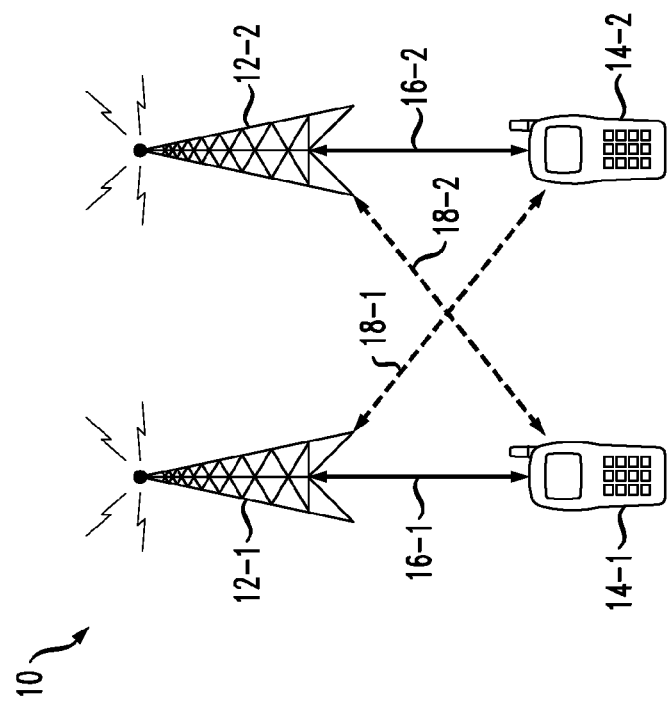

Coordination of such multipoint signal transmission by the base stations in a CoMP network is controlled by one or more controllers. For example, as shown in FIG. 1(B), a CoMP controller 22 is connected to each base station 12-1 and 12-2 via respective high-speed backhaul links 24-1 and 24-2. It is to be understood that while FIG. 1(B) shows a single controller, a CoMP network is not necessarily centralized in terms of its controller, i.e., CoMP processing may be distributed across multiple controllers.

Also, it is to be understood that while each network in FIG. 1 shows only two base stations and two mobile terminals, this is simply for ease of explanation, i.e., CoMP networks may utilize more than two base stations to transmit signals to a single mobile terminal, and CoMP networks may have large numbers of mobile terminals.

Figure 2:
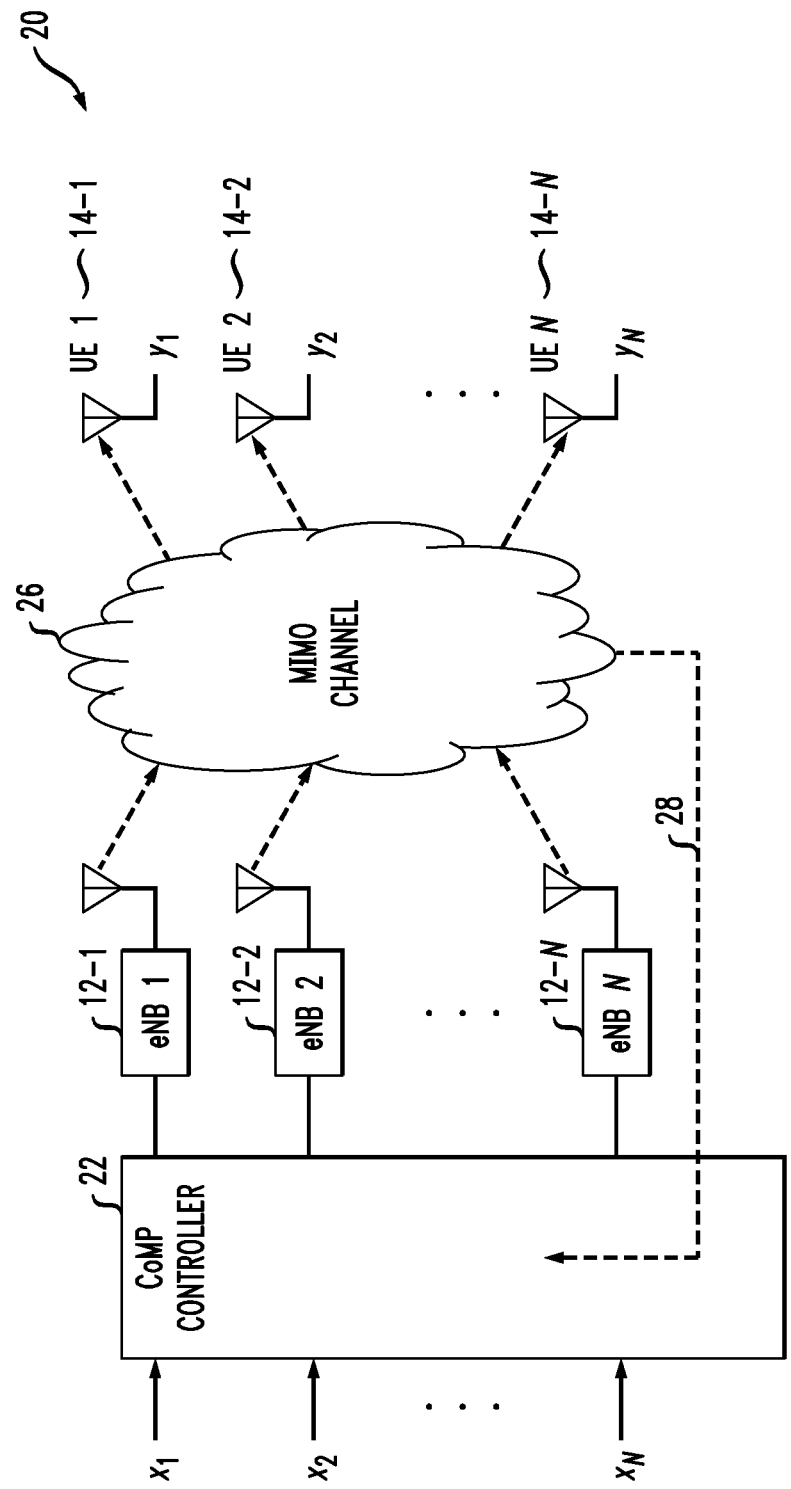
FIG. 2 is a diagram illustrating a CoMP network in which one or more methodologies according to one or more embodiments of the invention are implemented.

FIG. 2 shows the CoMP network 20 from the perspective of a 3GPP standard, i.e., using 3GPP terminology. That is, a mobile terminal is referred to as User Equipment (UE). Examples of UEs may include, but are not limited to, a mobile telephone, a portable computer, a wireless email device, a personal digital assistant (PDA) or some other user mobile communication device. Further, a base station is referred to as an eNodeB (eNB), which serves as an access point for one or more UEs to access the network.

Note that, for consistency, FIG. 2 uses the same reference numerals as used in FIG. 1(B). Also, FIG. 2 more generally shows N bases stations (eNBs) and N mobile terminals (UEs). Of course, it is not necessary that there be the same number of eNBs and UEs.

In an illustrative embodiment described here, we focus on a frequency division duplex (FDD) downlink CoMP arrangement. However, principles of the invention are not necessarily limited to such a transmission scenario. That is, by way of example only, principles of the invention are applicable to time division duplex (TDD) downlink CoMP transmissions.

Downlink CoMP requires multiple mutually remote eNBs (12-1 . . . 12-N) to jointly transmit data to one or more UEs (14-1 . . . 14-N). In order to perform the downlink CoMP transmission, the network needs to have knowledge of all the channel states between eNB and UE antennas, for all the UEs that are the subject of (to be recipients of) the CoMP transmission. The channel is collectively denoted in FIG. 2 as 26, and the channel state feedback (CSI) is collectively denoted as 28. The channel is referred to as a MIMO channel since the channel handles "multiple-input and multiple-output" transmissions.

Further, while the CSI feedback 28 is conceptually shown as coming from the channel 26 to the CoMP controller 22, it is to be understood that the CSI feedback 28 is provided by UEs (14-1 . . . 14-N) to eNBs (12-1 . . . 12-N), which then provide the CSI feedback 28 to the CoMP controller 22. That is, each UE performs downlink channel state estimation (e.g., pilot-assisted estimation using pilots broadcasted by the eNBs). The channel state estimates, i.e., channel state information (CSI), are then fed back over the uplink (through channel 26 from the UEs to the eNBs). As mentioned above, this uplink CSI feedback traffic is an overhead which adversely lowers the throughput of the user data traffic.

Note that CSI may be explicitly obtained in an FDD arrangement via feedback from UEs, as is assumed in the illustrative embodiment described here. However, in a TDD arrangement, in addition to explicit CSI feedback, CSI may also be obtained implicitly when the downlink and the uplink are substantially identical. In TDD, due to channel reciprocity, downlink and uplink channels are identical. Consequently, in the case of limited mobility, during the uplink transmission, the eNB obtains uplink channel state estimates, and then applies them as the downlink CSI during the subsequent downlink transmission.

Note also that, in FIG. 2, we illustrate single-antenna eNBs and UEs. In general, however, each eNB may have multiple sectors and multiple antennas within each sector. Furthermore, each UE may have multiple antennas. A sector refers to an angular portion of the overall coverage area of the eNB. In some cases, the sector is 360 degrees, and thus the base station has only one sector. However, the base station coverage area can be divided into any number of sectors.

In accordance with principles of the invention, a methodology is provided to reduce the channel information (CSI) feedback uplink data rates. Specifically, application of a multiuser access methodology is provided. Under this inventive methodology, the overall uplink CSI feedback data rate does not increase (or increases at an advantageously slow rate) with the number of UEs.

FIG. 3 presents a table 30 with relevant quantities that contribute to the uplink CSI feedback data rate, per each UE. As shown in the table, the following are contributory items: bandwidth W (row 31); frequency resolution $\Delta W$ (row 32); CSI report interval (temporal resolution) $T_U$ (row 33); CSI quantization resolution Q (row 34); antennas per sector $N_{TX}$ (row 35); antennas per UE $N_{RX}$ (row 36); and cluster size (number of coordinating sectors) K (row 37). More specifically, the contributory factors are defined as:

W—overall communication channel bandwidth;

$\Delta W$—in frequency domain, a unique channel state estimate is fed back every $\Delta W$ Hertz, where $\Delta W$ is less than or equal to W;

$T_U$—in time domain, a set of channel state estimates is fed back every $T_U$ seconds; and total of $W/\Delta W$ channel estimates are fed back every $T_U$ seconds;

Q—how many bits are used to quantize the channel estimate that is fed back;

$N_{TX}$—number of eNB antennas per sector;
$N_{RX}$—number of antennas per UE, used during downlink reception; and
K—number of sectors that take part in CoMP.

Accordingly, in row 38 of table 30, we show the CSI feedback rate, per UE, as $R_{FB\_ue} = K \times N_{RX} \times N_{TX} \times Q \times W / \Delta W \times 1/T_u$.

It is realized that if temporal and frequency resources are freely assigned to different users in the sector, the overall uplink CSI feedback rate will grow linearly with the number of UEs, $N_{ue}$, per sector, i.e.:

$$R_{FB} = N_{ue} R_{FB\_ue}.$$

Existing approaches do not impose any constraint on the temporal and frequency allocation among the UEs, thus resulting in a significant increase in the uplink CSI feedback rates with the number of UEs in each sector.

Considering that in each sector there will be many UEs, and that they may be the subject of (may be recipients of) CoMP transmissions, it is realized that the overall uplink CSI feedback rate is becoming a critical issue that may be hindering further application of CoMP. Therefore, in accordance with illustrative principles of the invention, a methodology is provided to slow or limit growth of the overall uplink CSI feedback rates with the number of same-sector UEs.

In order to limit the growth of the overall uplink CSI feedback rate, we introduce a restriction on how the temporal and frequency resources are allocated among same-sector UEs that are the subject of (to be recipients of) CoMP transmissions. Namely, UEs that belong to the same sector and are the subjects (recipients) of CoMP transmissions are allocated different frequency bands (i.e., groups of subcarriers) and concurrently receive the downlink transmission. Effectively, this is a frequency-division multiple access (FDMA) approach that is imposed as a restriction in order to limit the uplink CSI feedback rate with the number of UEs. That is, FDMA will be applied to multiple different UEs that belong to the same sector, each receiving CoMP transmission concurrently from multiple eNBs. This restriction will not be required for non-CoMP UEs. FDMA techniques are generally described, for example, in J. Proakis, Digital Communications, 3$^{rd}$ Edition, McGraw-Hill, 1995, the disclosure of which is incorporated by reference herein.

To prevent growth of the uplink CSI feedback rate with the number of UEs, we establish the following condition (referred to herein below as condition (1)): the minimum size of the contiguous frequency allocation $B_{min}$ to each CoMP UE in the sector is set equal to or greater than the coherence bandwidth $W_c$:

$$B_{min} \geq W_c \geq \Delta W \qquad (1)$$

where $\Delta W$ is the frequency resolution in table 30 of FIG. 3. Contiguous frequency allocation means that frequency allocated to one UE is continuous, i.e., in a single frequency block. Coherence bandwidth has the same wireless channel response across that bandwidth (i.e., frequency flat response). Frequency resolution corresponds to the bandwidth over which one channel state response estimate is fed back.

For example, for the number of same-sector UEs $N_{ue}=10$, if the above condition is met, the inventive approach will need 10 times lower uplink CSI feedback rate than an approach that does not implement the FDMA restriction. The gain grows linearly with $N_{ue}$.

One or many frequency bands may be allocated to one UE. In other words, the frequency allocation may be aggregated or distributed (e.g., to ensure frequency diversity).

In each case, the minimum size of the contiguous frequency allocation $B_{min}$ is selected to satisfy condition (1) to prevent growth of the uplink CSI feedback rate with the number of UEs.

Even if condition (1) is not strictly met, restricting the resource allocation to FDMA will lower the required uplink CSI feedback rate compared to the case where no restriction is imposed.

Figure 4:
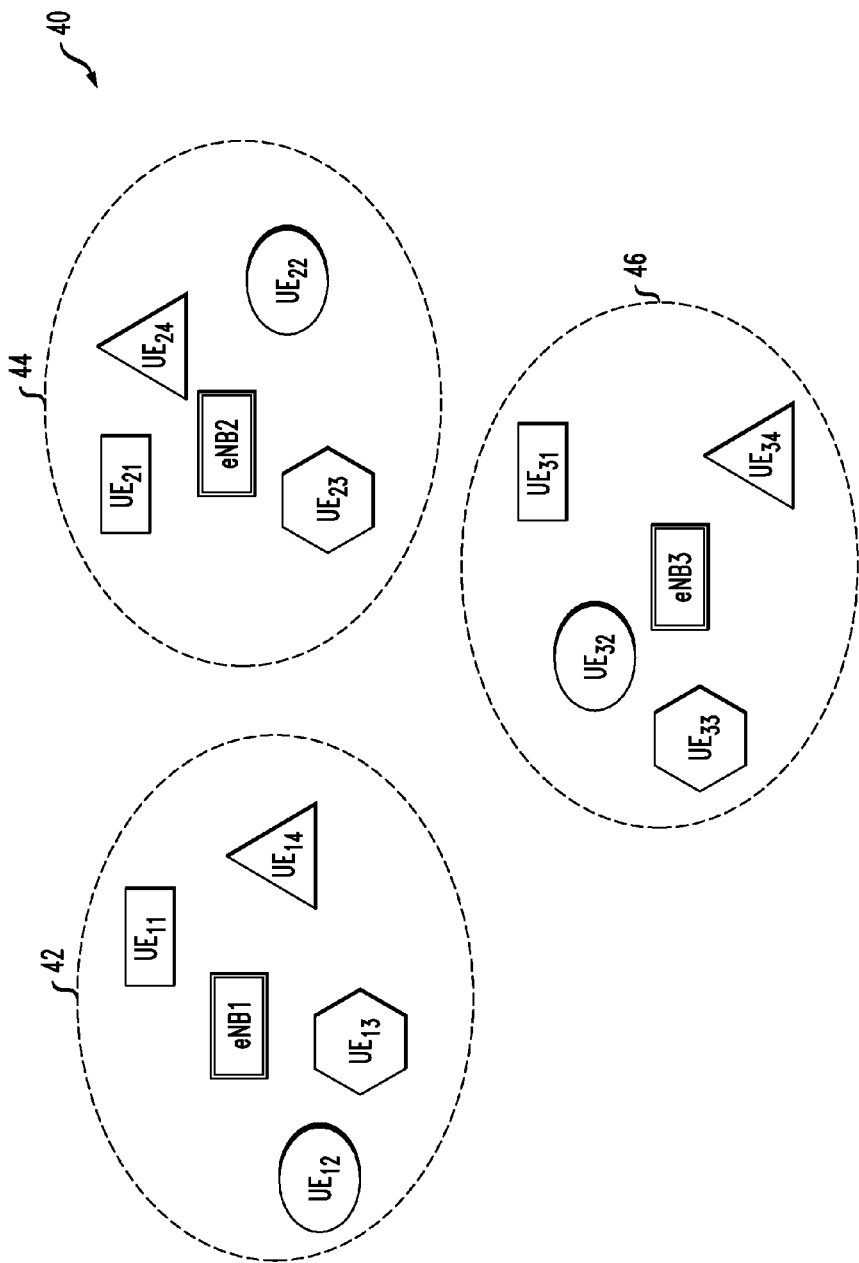
FIG. 4 is a diagram illustrating a frequency allocation methodology according to an embodiment of the invention.

FIG. 4 depicts a network 40 with three eNBs, and four UEs per each eNB. For the sake of simplicity, single-sector eNBs are depicted, i.e., sectors 42, 44 and 46 correspond to eNB1, eNB2 and eNB3, respectively. The UEs which have the same shape (rectangle, circle, hexagon and triangle) will have the same frequency bands and will belong to the same CoMP group. The UEs which have different shapes are assigned different and non-overlapping frequency bands, belonging to different CoMP groups. In FIG. 4, the first UE subscript index denotes eNB, i.e., sector association, while the second index denotes the frequency band and CoMP group to which it belongs.

A determination/selection of the particular CoMP grouping and frequency assignments may be performed by one or more network elements. For example, a media access control (MAC) layer resource scheduler may consider the CoMP criteria, decide whether a UE is a subject of CoMP, and determine to which group it will belong. Such a resource scheduler is one example of a CoMP controller function as illustratively depicted in FIG. 1(B) as network element 22.

The UEs in the same group (same shape) will be feeding back channel state estimates corresponding only to the frequency band(s) they are assigned to, thus limiting the overall uplink CSI feedback rate.

More particularly, it is to be understood that in the illustrative CoMP transmission scenario of FIG. 4, $UE_{11}$, $UE_{21}$ and $UE_{31}$ each receive respective pilot signals from eNB1, eNB2 and eNB3 in a first frequency band (or first set of frequency bands) uniquely assigned by the CoMP controller to that group of UEs. Likewise, $UE_{12}$, $UE_{23}$ and $UE_{33}$ each receive respective pilot signals from eNB1, eNB2 and eNB3 in a second frequency band (or second set of frequency bands) uniquely assigned by the CoMP controller to that group of UEs. Further, $UE_{13}$, $UE_{23}$ and $UE_{33}$ each receive respective pilot signals from eNB1, eNB2 and eNB3 in a third frequency band (or third set of frequency bands) uniquely assigned by the CoMP controller to that group of UEs. Still further, $UE_{14}$, $UE_{24}$ and $UE_{34}$ each receive respective pilot signals from eNB1, eNB2 and eNB3 in a fourth frequency band (or fourth set of frequency bands) uniquely assigned by the CoMP controller to that group of UEs. It is to be understood that the "unique" assignment means that the each frequency band (or set of bands) is different from (non-overlapping with) the other three frequency bands (or sets of bands). Advantageously, in accordance with the invention, no two UEs in the same sector (42, 44 or 46) receive pilot signals over the same frequency band.

Then, each UE performs channel state estimation using the pilot signals received in the assigned frequency band(s) and then sends the channel state information (CSI) resulting from the estimation process back to at least its closest eNB (referred to as the anchor eNB) but it can be sent back to all eNBs participating in the CoMP transmission. Thus, by way of example, $U_{11}$ sends CSI back to eNB1 alone (since that is its anchor eNB) or to all eNBs from which it received pilot signals, i.e., eNB1, eNB2 and eNB3.

It is important to note that the CSI sent from a UE back to an eNB does not have to be transmitted over the same frequency band(s) over which the UE received the pilot signals, although it could do so. That is, the slowing or limiting of the growth of the overall uplink CSI feedback rates with the number of same-sector UEs is achieved by the assignment of unique downlink communication resources (e.g., frequency bands in this embodiment) as described in detail herein. In this way, UEs in the same allocation group (e.g., $UE_{11}$, $UE_{21}$ and $UE_{31}$) feed back channel state estimates corresponding only to the one or more frequency bands to which they are assigned, thus limiting the overall uplink CSI feedback rate.

Figure 5:
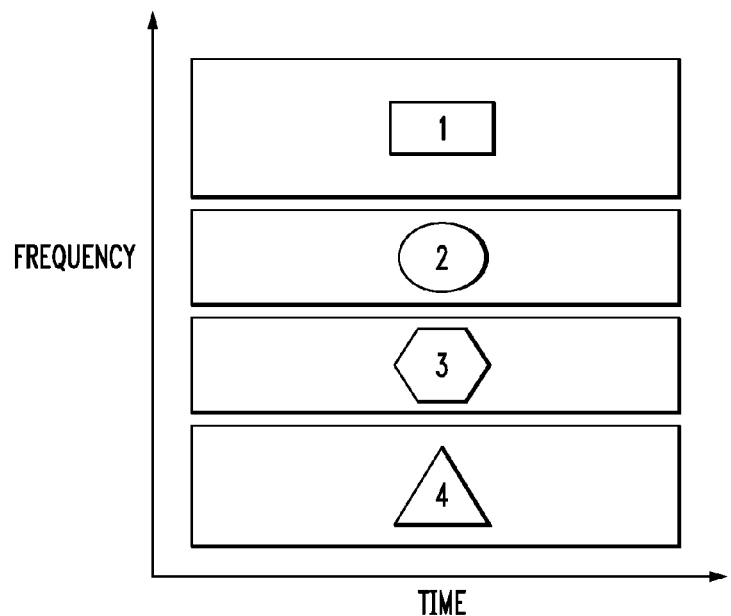
FIG. 5 is a diagram illustrating an aggregated frequency allocation according to an embodiment of the invention.
Figure 6:
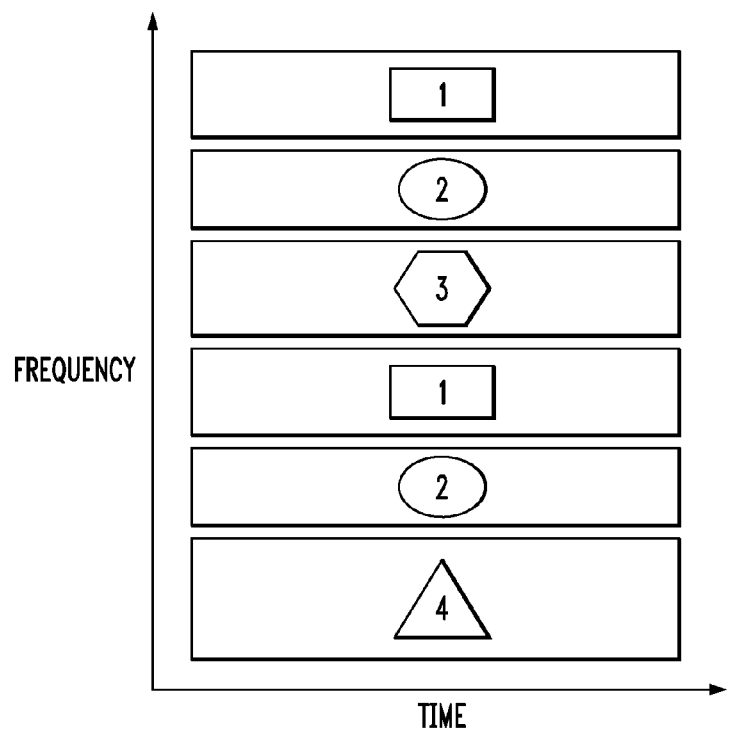
FIG. 6 is a diagram illustrating a distributed frequency allocation according to an embodiment of the invention.

FIG. 5 depicts a possible aggregated frequency allocation, while FIG. 6 depicts a distributed frequency allocation. That is, the illustrative frequency allocation in FIG. 5 is considered "aggregate" because only one contiguous frequency block is allocated to one UE. In contrast, the illustrative frequency allocation in FIG. 6 is considered "distributed" because multiple frequency blocks are allocated to the same UE, and the blocks are dispersed though overall bandwidth.

Figure 7:
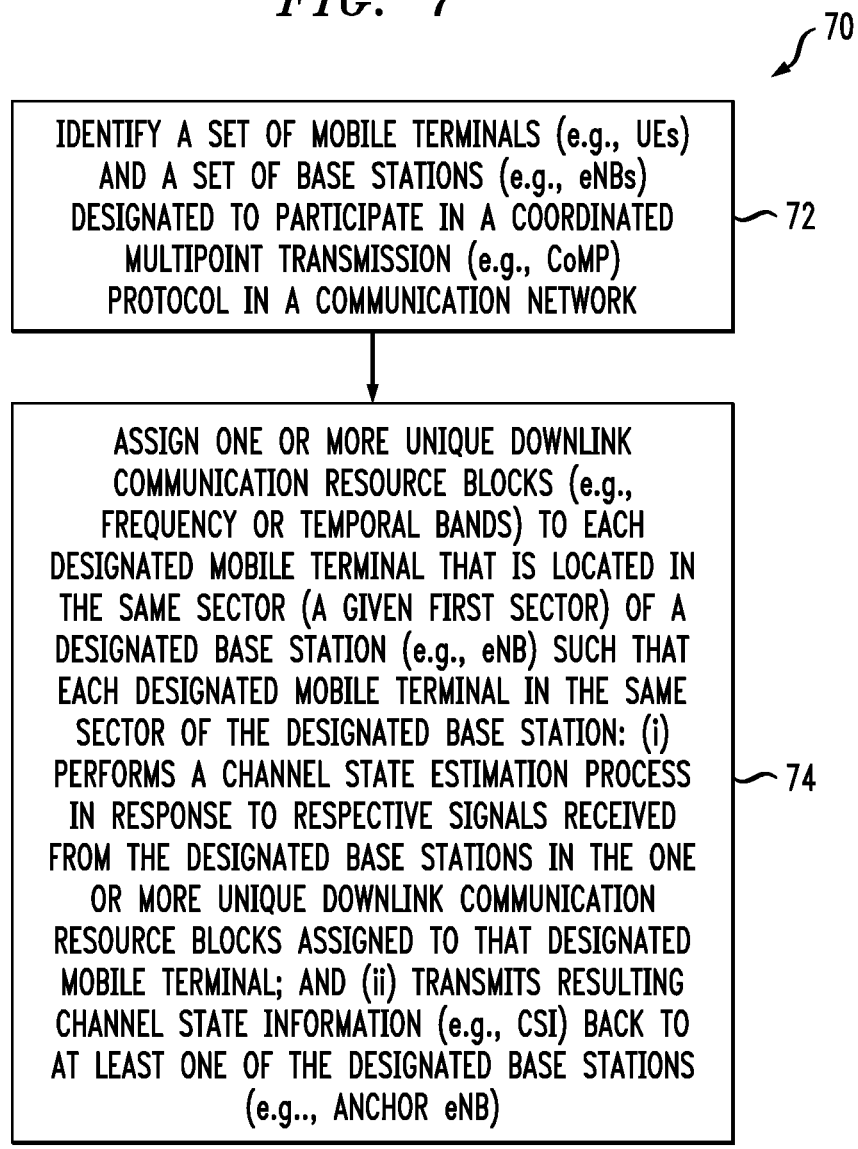
FIG. 7 is a diagram illustrating a methodology for reducing channel information feedback in a communication network according to an embodiment of the invention.

FIG. 7 is a diagram illustrating a methodology 70 for reducing channel information feedback in a communication network according to an embodiment of the invention. It is to be appreciated that the steps of methodology 70 may be implemented in one or more network elements. By way of one example, the steps are performed in a CoMP controller (22 in FIG. 1(B)). However, all or parts of the methodology may be performed in other network elements, alone or in combination, such as, for example, one or more base stations and/or one or more mobile terminals.

As shown, step 72 identifies a set of mobile terminals (e.g., UEs) and a set of base stations (e.g., eNBs) designated to participate in a coordinated multipoint transmission (e.g., CoMP) protocol in a communication network. Thus, the "designated mobile terminals" are CoMP mobile terminals and the "designated base stations" are CoMP base stations. As mentioned above, the identification step may be accomplished by a MAC layer resource scheduler functioning as a CoMP controller.

Then, in step 74, the methodology assigns one or more unique downlink communication resource blocks (e.g., frequency or temporal bands) to each designated mobile terminal that is located in the same sector (a given first sector) of a designated base station (e.g., eNB) such that each designated mobile terminal in the same sector of the designated base station: (i) performs a channel state estimation process in response to respective signals received from the designated base stations in the one or more unique downlink communication resource blocks assigned to that designated mobile terminal; and (ii) transmits resulting channel state information (e.g., CSI) back to at least one of the designated base stations (e.g., anchor eNB). Again, the assignment may be accomplished by a MAC layer resource scheduler functioning as a CoMP controller.

As explained above, in this manner, channel information feedback in a communication network is advantageously reduced.

Figure 8:
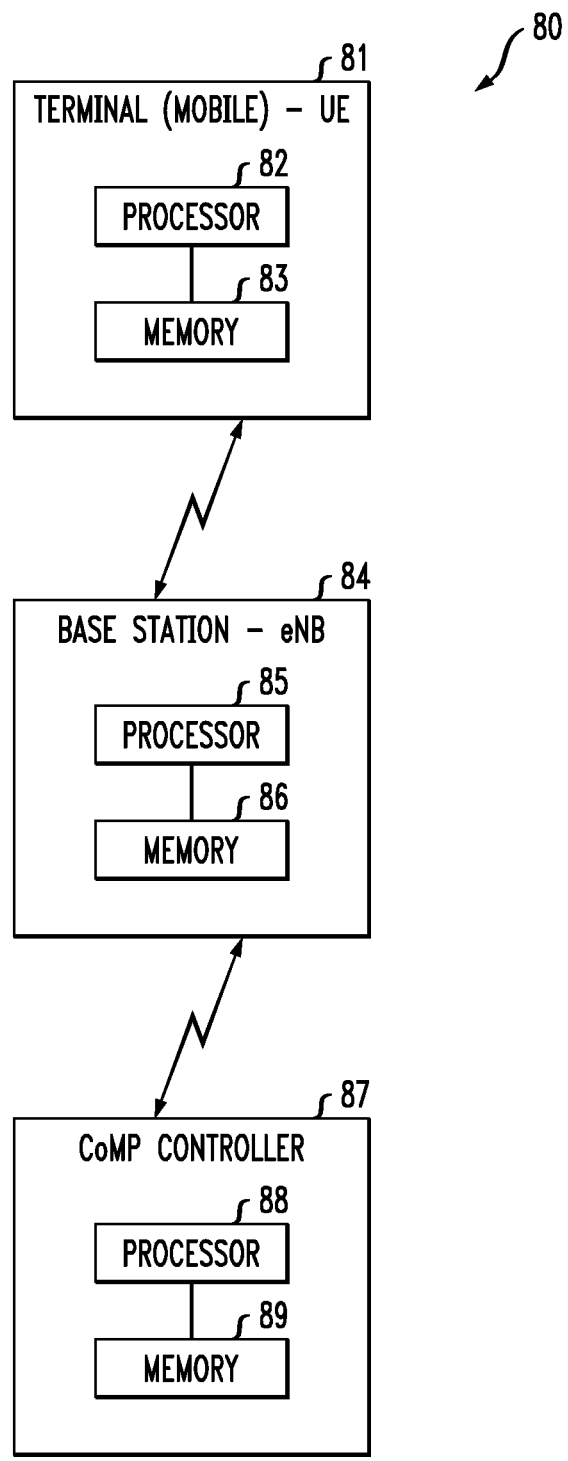
FIG. 8 is a diagram illustrating processing architecture for implementing a methodology for reducing the channel feedback rate in a CoMP network according to an embodiment of the invention.

FIG. 8 shows a processing architecture for implementing a methodology for reducing the CSI feedback rate in a CoMP network according to an embodiment of the invention. More particularly, FIG. 8 shows a more detailed view of a portion 80 of a CoMP network including mobile terminal (UE) 81, base station (eNB) 84 and CoMP controller 87. Note that only one mobile terminal, one base station and one CoMP controller are shown for the sake of simplicity. Mobile terminal 81 corresponds to one of the mobile terminals 14-1 . . . 14-N in FIGS. 1(B) and 2, while base station 84 corresponds to one of the base stations 12-1 . . . 12-N in FIGS. 1(B) and 2, and CoMP controller 87 corresponds to the CoMP controller 22 in FIGS. 1(B) and 2.

In this embodiment, mobile terminal 81 includes processor 82 and memory 83, while base station 84 includes processor 85 and memory 86, and CoMP controller 87 includes processor 88 and memory 89. Omitted from the figure for clarity of illustration are transceiver circuitry and antennas. Also, omitted from the figure for clarity of illustration are input/output interfaces and network interfaces.

One or more software programs for implementing the methodologies and principles described herein (e.g., in the context of FIG. 1-7) may be stored in one or more of memories 83, 86 and 89 and executed by one or more of processors 82, 85 and 88. Memories 83, 86 and 89 may each therefore be considered a processor-readable (or computer-readable, or machine-readable) storage medium. Processors 82, 85 and 88 may include multiple integrated circuits, digital signal processors or other types of processing devices, and associated supporting circuitry, in any combination. Of course, numerous alternative arrangements of hardware, software or firmware in any combination may be utilized in implementing mobile terminal 81, base station 84, CoMP controller 87, or particular elements thereof.

Further, it is to be appreciated that the term "processor" as used herein is intended to include any processing device, such as, for example, one that includes a CPU (central processing unit) and/or other forms of processing circuitry. Further, the term "processor" may refer to more than one individual processor device. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The phrase "network interface" as used herein is intended to include, for example, one or more network adapters such as modems and wide/local area network cards.

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device. That is, a computer readable storage medium stores processor device executable instructions which, when executed by a processor device, perform one or more steps of the inventive methodologies described herein.

Advantageously, as illustratively explained herein, many benefits are realized by the inventive techniques described herein; by way of example only, they include:

(1) The inventive techniques dramatically lower the uplink CSI feedback rates which provide additional uplink resources for user data traffic.

(2) The inventive techniques provide a solution that is advantageous for effective implementation of CoMP.

(3) The inventive techniques are particularly useful for FDD cellular systems which are most widely deployed.

(4) The inventive techniques apply a solution enabling easy implementation.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    identifying a set of mobile terminals and a set of base stations designated to participate in a coordinated multipoint transmission protocol in a communication network;
    assigning, for each of a plurality of sectors of a designated base station, one or more unique downlink communication resource blocks to each of a plurality of designated mobile terminals that are located in a first sector of the designated base station; and
    assigning the same one or more unique downlink communication resource blocks assigned to a given one of the terminals in the first sector to a designated mobile terminal in a second sector of the designated base station such that each designated mobile terminal in the first and second sectors of the designated base station: (i) performs a channel state estimation process in response to respective signals received from the designated base stations in the one or more unique downlink communication resource blocks assigned to that designated mobile terminal; and (ii) transmits resulting channel state information back to at least one of the designated base stations;
    wherein the one or more unique downlink communication resource blocks are assigned such that a minimum size of a contiguous frequency allocation to each designated mobile terminal in the first sector is set equal to or greater than a coherence bandwidth attributable to the first sector.

2. The method of claim 1, wherein the one or more unique downlink communication resource blocks assigned to each designated mobile terminal comprise one or more non-overlapping sets of frequency values.

3. The method of claim 2, wherein the one or more non-overlapping sets of frequency values are contiguous with respect to a given frequency range.

4. The method of claim 2, wherein the one or more non-overlapping sets of frequency values are non-contiguous with respect to a given frequency range.

5. The method of claim 1, wherein the one or more unique downlink communication resource blocks assigned to each designated mobile terminal comprise one or more non-overlapping sets of time values.

6. The method of claim 5, wherein the one or more non-overlapping sets of time values are contiguous with respect to a given temporal range.

7. The method of claim 5, wherein the one or more non-overlapping sets of time values are non-contiguous with respect to a given temporal range.

8. The method of claim 1, wherein the identifying and assigning steps are performed by one or more network elements in the communication network.

9. The method of claim 8, wherein the one or more network elements comprise one or more coordinated multipoint transmission controllers.

10. An apparatus comprising:
    a memory; and
    a processor device operatively coupled to the memory and configured to:
    identify a set of mobile terminals and a set of base stations designated to participate in a coordinated multipoint transmission protocol in a communication network;
    assign, for each of a plurality of sectors of a designated base station, one or more unique downlink communication resource blocks to each of a plurality of designated mobile terminals that are located in a first sector of the designated base station; and
    assign the same one or more unique downlink communication resource blocks assigned to a given one of the terminals in the first sector to a designated terminal in a second sector of the designated base station such that each designated mobile terminal in the first and second sectors of the designated base station: (i) performs a channel state estimation process in response to respective signals received from the designated base stations in the one or more unique downlink communication resource blocks assigned to that designated mobile terminal; and (ii) transmits resulting channel state information back to at least one of the designated base stations;
    wherein the one or more unique downlink communication resource blocks are assigned such that a minimum size of a contiguous frequency allocation to each designated mobile terminal in the first sector is set equal to or greater than a coherence bandwidth attributable to the first sector.

11. The apparatus of claim 10, wherein the one or more unique downlink communication resource blocks assigned to each designated mobile terminal comprise one or more non-overlapping sets of frequency values.

12. The apparatus of claim 11, wherein the one or more non-overlapping sets of frequency values are contiguous with respect to a given frequency range.

13. The apparatus of claim 11, wherein the one or more non-overlapping sets of frequency values are non-contiguous with respect to a given frequency range.

14. The apparatus of claim 10, wherein the one or more unique downlink communication resource blocks assigned to each designated mobile terminal comprise one or more non-overlapping sets of time values.

15. The apparatus of claim 14, wherein the one or more non-overlapping sets of time values are contiguous with respect to a given temporal range.

16. The apparatus of claim 14, wherein the one or more non-overlapping sets of time values are non-contiguous with respect to a given temporal range.

17. The apparatus of claim 10, wherein the processor device and the memory are part of a coordinated multipoint transmission controller.

18. An article of manufacture comprising:
    a non-transitory computer readable storage medium for storing processor device executable instructions which when executed by a processor device:

identify a set of mobile terminals and a set of base stations designated to participate in a coordinated multipoint transmission protocol in a communication network;

assign, for each of a plurality of sectors of a designated base station, one or more unique downlink communication resource blocks to each of a plurality of designated mobile terminals that are located in a first sector of the designated base station; and assign the same one or more unique downlink communication resource blocks assigned to a given one of the terminals in the first sector to a designated terminal in a second sector of the designated base station such that each designated mobile terminal in the first and second sectors of the designated base station: (i) performs a channel state estimation process in response to respective signals received from the designated base stations in the one or more unique downlink communication resource blocks assigned to that designated mobile terminal; and (ii) transmits resulting channel state information back to at least one of the designated base stations;

wherein the one or more unique downlink communication resource blocks are assigned such that a minimum size of a contiguous frequency allocation to each designated mobile terminal in the first sector is set equal to or greater than a coherence bandwidth attributable to the first sector.

* * * * *

UNITED STATES PATENT AND TRADEMARK OFFICE
CERTIFICATE OF CORRECTION

PATENT NO. : 8,965,389 B2
APPLICATION NO. : 13/017304
DATED : February 24, 2015
INVENTOR(S) : Dragan Samardzija et al.

Page 1 of 1

It is certified that error appears in the above-identified patent and that said Letters Patent is hereby corrected as shown below:

In the Specification

Column 5, line 49, after "bandwidth" please change "$W_e$" to -- $W_c$ --

Signed and Sealed this
Twenty-fifth Day of August, 2015

Michelle K. Lee
*Director of the United States Patent and Trademark Office*